UNITED STATES PATENT OFFICE.

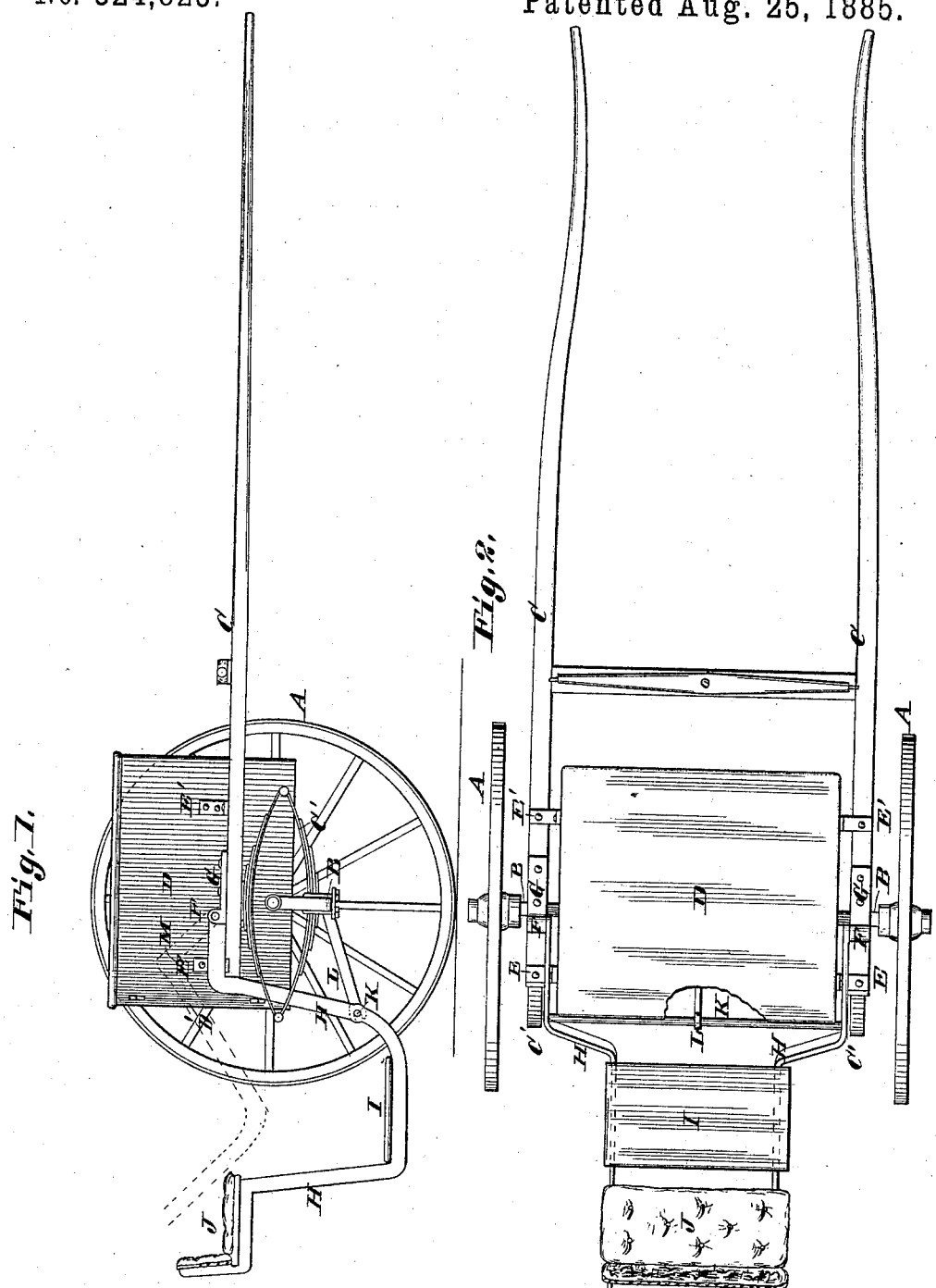

HERMANN ESCHE, OF ST. LOUIS, MISSOURI.

TWO-WHEELED VEHICLE.

SPECIFICATION forming part of Letters Patent No. 324,823, dated August 25, 1885.

Application filed July 6, 1885. (No model.)

*To all whom it may concern:*

Be it known that I, HERMANN ESCHE, a citizen of the United States, residing at St. Louis, in the State of Missouri, have invented a new and useful Improvement in Vehicles, of which the following is a specification.

My invention relates to improvements in vehicles, in which it is designed to arrange a seat and platform at the rear of the axle of a two-wheeled vehicle of a kind generally used by mail or newspaper carriers; and the object of my improvements are, first, to provide a receptacle for carrying mail-matter, papers, bills, &c., which is dry, clean, and easy of access, and, second, to provide safe and desirable means for quickly mounting and alighting from such vehicle, all of which will be hereinafter more fully described.

To enable others skilled in the art to which my invention appertains to make and use the same, I will now proceed to describe its construction and operation, referring to the accompanying drawings, which form a part of this specification, and in which—

Figure 1 is a side elevation of my improved vehicle with one wheel removed. Fig. 2 is a top view of my improved vehicle with part of the rear edge of the box D broken away in order to show the connection of the brace L with the brace-rod K.

Similar letters refer to similar parts throughout the several views.

A represents the wheels; B, the axle; C, the shafts, and C' the springs of my improved vehicle, upon which is mounted the box D, having the doors D'. This box is designed to carry newspapers, mail-matter, &c.

Instead of the doors D' a hinged lid may be secured to the top of the box D in an inclined or slanting position in order to shed rain. The box D is fastened to the shafts C by means of the brackets E and E'. The seat-frame or hanger H is pivotally secured to the block G (which is mounted upon shaft C) by the pivot F. This seat-frame may be made of wood or iron—preferably hollow iron, which possesses strength and lightness.

I is the foot-board; J, the seat, arranged and mounted on the seat-frame or hanger H, substantially as shown. K is a brace permanently secured to the sides of the seat-frame or hanger H. L is a brace-rod rigidly secured to the axle B at its forward end, and provided at its rear end with a curved recess in which the brace K rests when in its normal position.

The object in having the seat-frame H pivotally secured to the block G on the shafts C is that when necessary to pass over rough roads, or when not in actual use, it may be raised to pass over obstructions, in which case a pin, M, is inserted in the side of the box D, which being drawn out serves as a rest to hold up the seat-frame H, as shown in the dotted lines, Fig. 1; or, if desirable, the seat-frame H may be turned forward far enough to let the seat J rest upon the box D. In either case the driver rides upon the box D.

It is obvious that by constructing a vehicle for the purpose stated on this plan the essential and important purpose of mounting and dismounting readily and without danger, is easily accomplished.

Having thus fully described my invention, what I claim and desire to secure by Letters Patent of the United States, is—

1. In a two-wheeled vehicle having the bent shaft B, and box D, the pivotal seat-frame H, hinged to the block G by the pivot F, substantially as and for the purpose specified.

2. A two-wheeled vehicle consisting, substantially, of the box D, pivotal seat-frame H, brace L, and brace-rod K, in combination with the wheels A, axle B, shafts C, block G, and pivot F, all substantially as and for or with the purposes set forth.

In testimony that I claim the foregoing I have hereunto set my hand this 30th day of June, 1885.

HERMANN ESCHE.

In presence of—
WM. H. OSMER,
ZOURA B. OSMER.